United States Patent [19]
Janssen et al.

[11] Patent Number: 6,045,922
[45] Date of Patent: *Apr. 4, 2000

[54] PROTECTIVE ADHESIVE ARTICLE

[75] Inventors: Jeffrey R. Janssen, Woodbury; Eugene G. Joseph, Vadnais Heights; Louis E. Winslow, Stillwater, all of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/884,494

[22] Filed: Jun. 27, 1997

Related U.S. Application Data

[63] Continuation of application No. 08/446,444, May 22, 1995, abandoned.

[51] Int. Cl.$^7$ ...................................................... B32B 27/08
[52] U.S. Cl. ......................... 428/515; 428/516; 428/517; 428/518; 428/519; 428/521
[58] Field of Search ..................... 428/515, 516, 428/517, 518, 519, 521

[56] References Cited

U.S. PATENT DOCUMENTS

| | | | |
|---|---|---|---|
| 2,082,791 | 6/1937 | Copeman | 280/152 |
| 3,434,904 | 3/1969 | Wiggins | 156/306 |
| 3,635,755 | 1/1972 | Balinth et al. | 117/122 P |
| 3,635,759 | 1/1972 | Balinth et al. | 117/122 P |
| 3,642,567 | 2/1972 | Rogers, Jr. | 161/165 |
| 3,954,697 | 5/1976 | McConnell et al. | 526/350 |
| 3,970,599 | 7/1976 | Schwarcz | 260/77.5 CH |
| 4,178,272 | 12/1979 | Meyer, Jr. et al. | 260/27 R |
| 4,261,401 | 4/1981 | Hickey | 150/52 K |
| 4,525,501 | 6/1985 | Norman et al. | 524/28 |
| 4,751,121 | 6/1988 | Kühnel et al. | 428/40 |
| 4,763,783 | 8/1988 | Talbot | 206/335 |
| 4,967,015 | 10/1990 | Karcher et al. | 568/616 |
| 5,006,578 | 4/1991 | Masuda et al. | 524/128 |
| 5,090,861 | 2/1992 | Malcolm et al. | 412/37 |
| 5,127,974 | 7/1992 | Tomiyama et al. | 156/85 |
| 5,202,361 | 4/1993 | Zimmerman et al. | 522/120 |
| 5,227,442 | 7/1993 | Babu et al. | 526/279 |
| 5,242,650 | 9/1993 | Rackovan et al. | 264/509 |
| 5,286,781 | 2/1994 | Gotoh et al. | 524/505 |
| 5,294,278 | 3/1994 | Matsui et al. | 156/248 |
| 5,296,277 | 3/1994 | Wilson et al. | 428/40 |
| 5,308,389 | 5/1994 | Russo et al. | 427/385.5 |
| 5,567,515 | 10/1996 | Koga et al. | 428/355 |

FOREIGN PATENT DOCUMENTS

| | | |
|---|---|---|
| 32913/89 | 10/1989 | Australia . |
| 384598 | 8/1990 | European Pat. Off. . |
| 519278 | 12/1992 | European Pat. Off. . |
| 615983 | 9/1994 | European Pat. Off. . |
| 33 16 385 A1 | 5/1983 | Germany . |
| 54-7303 | 5/1979 | Japan . |
| 5-98223 | 4/1993 | Japan . |
| 6-128538 | 5/1994 | Japan . |
| 7-126582 | 5/1995 | Japan . |
| 2191717 | 12/1987 | United Kingdom . |
| 2253401 | 9/1992 | United Kingdom . |
| WO 95/11655 | 5/1995 | WIPO . |
| WO 95/11945 | 5/1995 | WIPO . |

*Primary Examiner*—Edward J. Cain
*Attorney, Agent, or Firm*—Doreen S. L. Gwin

[57] ABSTRACT

An adhesive article comprises a backing having opposed top and bottom surfaces and a layer of a pressure sensitive adhesive on the bottom surface. The pressure sensitive adhesive comprises selected poly-α-olefin polymers and a cold flow restricting agent. The adhesive articles are especially useful for protecting motor vehicles from damage during manufacture, transport and storage.

47 Claims, No Drawings

PROTECTIVE ADHESIVE ARTICLE

This is a continuation of application Ser. No. 08/446,444 filed May 22, 1995, now abandoned.

BACKGROUND OF THE INVENTION

1. Field of the Invention

This invention relates generally to adhesive articles and, more specifically, to adhesive articles that are useful for protecting motor vehicles during manufacture, transport and storage.

2. Description of the Related Art

Motor vehicles are painted early in the manufacturing process. Once painted, the body of the vehicle moves along an automated assembly line so that other parts can be added. During this process the vehicle may be inadvertently hit, nicked, dinged, etc. by assembly line workers, nearby equipment, tools, etc. Depending on the severity of the damage, it may be necessary to repaint part of the vehicle, which is an expensive and time consuming process. Once manufactured, the vehicles are shipped by railroad, truck or ship to distribution centers, and eventually to dealers who will sell the vehicles. While in transit, the vehicles may become damaged or discolored due to flying road gravel, soot, metal particulates, exhaust gases, harsh sunlight, leaking fluids (for example, from adjacent vehicles or the carrier), acid rain, bird dung, numerous chemicals, etc. Severe damage may require that the vehicles be repainted. Vehicles may sit on open-air dealer lots for several weeks or more before they are sold. During this time they can be damaged by many of the hazards that arise during shipping as well as by incidental contact from salespeople and potential buyers. This could result in part of the vehicle having to be repainted.

One way to safeguard motor vehicles during manufacture, transport and storage is to use a protective adhesive article such as a protective adhesive sheet or adhesive tape (i.e., a backing with an adhesive on it). Adhesive articles useful for protecting motor vehicles should have certain attributes. For example, they should not leave an imprinted pattern on the painted surface of the motor vehicle. Variations in raw materials and manufacturing processes may cause the paints used on some vehicles to cure more slowly than the paints used on other vehicles. Partially cured paints may be "softer" than fully cured paints. Also some manufacturers prefer to use "softer" paints. In addition, when the vehicles are being shipped, temperatures may become as high as about 80° C., which can cause some paints to soften. Consequently, the adhesive used in the protective film should be softer than the paint that it touches, since a less flowable adhesive could leave an undesirable imprinted pattern on the painted surface.

The adhesive should provide good adhesion to the painted vehicle so that the protective article does not come off during use. However, it should not be difficult to remove the article when it is no longer needed. The protective article should also remove cleanly without leaving traces of adhesive residue on the painted vehicle. In addition, it is desirable that the protective article be recyclable. Increasing concern for the environment has created a demand for waste and packaging that can be recycled.

Several methods have been developed to protect motor vehicles during manufacture, transport and storage. For example, water soluble or dispersible compositions have been sprayed as temporary coatings which can later be removed with water or alkali. See for example, U.S. Pat. No. 4,525,501 (Norman et al), U.S. Pat. No. 3,642,567 (Rogers, Jr.), and U.S. Pat. No. 5,006,578 (Masuda et al). Another method involves spraying a composition on the surface to be protected, drying or curing the composition, and subsequently removing the resulting film by stripping or peeling. For examples, see British Patent Publication Nos. 2,191,717 and 2,253,401 (each to Gramos Chemical).

As suggested before, another method of protection uses a tape or sheet which includes a pressure sensitive adhesive (PSA) on a backing or support. The tape or sheet is removed from the motor vehicle when it is no longer needed. U.S. Pat. No. 5,286,781 (Gotoh et al) describes a tape or sheet having a PSA containing a block copolymer, a tackifying resin, and a polyolefin. European Patent Publication No. 519,278 (Matsui et al) describes a protective sheet that uses a rubber based PSA having a dynamic modulus of from $2 \times 10^5$ to $7 \times 10^6$ dynes/cm$^2$ at 60° C. Japanese Kokai Patent Application No. Hei 6[1994]-128538 (Matsui et al) describes a very similar protective sheet that is supplemented by the addition of an anti-static agent. Japanese Kokai Patent Application No. Hei 6[1994]-128540 (Tsuchibashi et al) discusses a protective film having an adhesive layer containing a polyisobutylene or butyl rubber and a primer for bonding the adhesive to a colored olefin-type support film. Japanese Kokai Patent Application No. Hei 5[1993]-98223 (Kawabata et al) discusses a surface protection film having an adhesive layer consisting of a block copolymer, a tackifier resin, and an ethylene α-olefin copolymer and/or propylene α-olefin copolymer on one side of a polyolefin type base film.

However, there still remains a need for improved protective adhesive articles that will not imprint the painted surface of a motor vehicle, that have good adhesion, that can be cleanly and easily removed when no longer needed, and that can be recycled.

SUMMARY OF THE INVENTION

In general, and in one embodiment, the invention relates to an adhesive article comprising a backing having opposed, major top and bottom surfaces, and a pressure sensitive adhesive on the bottom surface of the backing. The pressure sensitive adhesive comprises: (a) a substantially uncrosslinked poly-α-olefin polymer selected from the group consisting of polyhexene, polyoctene, a copolymer of hexene and octene, a copolymer of hexene and propylene, a copolymer of octene and propylene, and mixtures thereof; and (b) an effective amount of a cold flow restricting agent. In another embodiment, the adhesive articles of the invention are provided in the form of a roll with a low adhesion backsize on the top surface of the backing.

Quite advantageously, the adhesive articles of the invention display a variety of properties that make them especially useful as protective adhesive covers, such as for protecting a painted motor vehicle from damage during manufacture, transport and storage. For example, the adhesive articles of the invention do not imprint painted metal surfaces. Furthermore, the protective adhesive articles of the invention display good initial adhesion to painted metal surfaces so that the protective articles will not come loose during use. Yet, the protective adhesive articles can be easily and cleanly removed from the same surface without tearing into pieces and without leaving an adhesive residue on the surface. Once removed, the protective adhesive articles of the invention can be recycled, by which it is meant that they can be subsequently melt processed (e.g., ground up and extruded) and the resulting melt or extrudate can be reused, for example in the manufacture of new protective adhesive articles as well as in the manufacture of plastic bags and other items that employ non-virgin starting materials.

The poly-α-olefin polymer preferably has an inherent viscosity of about 1.0 to 5.0 dl/g, although the range of about 1.5 to 2.6 dl/g is more preferred if the poly-α-olefin polymer is polyhexene and the range of about 1.2 to 3.2 dl/g is more preferred if the poly-α-olefin polymer is polyoctene. It is also preferred that the poly-α-olefin polymer have a polydispersity index less than or equal to about 10.

The cold flow restricting agent typically has a softening point of at least about 80° C. and can be a material such as polyethylene, polypropylene, ethylene-vinyl acetate, blends of a polyolefin and a thermoplastic elastomer, styrene-butadiene-styrene block copolymer, styrene-isoprene-styrene block copolymer, and styrene-ethylene/butylene-styrene block copolymer. Preferably, the cold flow restricting agent comprises about 5 to 30 parts by weight per 100 parts by weight of the poly-α-olefin polymer, more preferably about 15 to 20 parts by weight, and most preferably about 20 parts by weight.

The backing is preferably a conformable, non-elastic material so that it can be stretched to follow the complex, multiplanar contours found in motor vehicles and, once stretched, maintains the three-dimensional state that it assumed. Useful backing materials include impact modified polypropylene, polypropylene homopolymer blended with low density polyethylene, and, polyethylene-polyoctene copolymer blended with low density polyethylene.

DETAILED DESCRIPTION OF THE PREFERRED EMBODIMENTS

In one embodiment, the adhesive articles of the invention comprise and, more preferably, consist essentially of a pressure sensitive adhesive disposed on the bottom surface of a backing having opposed top and bottom surfaces. The adhesive article may be provided as a tape or a sheet, a tape being regarded as an adhesive article that has a length that is substantially greater than its width, while a sheet has length and width dimensions that are more nearly the same. The adhesive articles of the invention are particularly useful as adhesive covers for protecting motor vehicles during manufacture, transport and storage.

The pressure sensitive adhesive used in the articles of the invention comprises and, more preferably, consists essentially of (a) a substantially uncrosslinked poly-α-olefin polymer selected from the group consisting of polyhexene, polyoctene, a copolymer of hexene and octene, a copolymer of hexene and propylene, a copolymer of octene and propylene, and blends thereof, and (b) an effective amount of a cold flow restricting agent.

Preferably, the substantially uncrosslinked poly-α-olefin polymer has a polydispersity index of less than or equal to about 10. The polydispersity index is the ratio of the weight-average molecular weight ($M_w$) to the number-average molecular weight ($M_n$) of the polymer and defines the molecular weight distribution. A narrow molecular weight distribution (i.e., a small polydispersity index) yields improved properties. When the polydispersity index is greater than about 10, the amounts of low and high molecular weight fractions increase. The low molecular weight fraction may act as a plasticizer, softening the adhesive, reducing its modulus, making it more tacky, and increasing the chance that adhesive residue will remain after removal of the article. On the other hand, the high molecular weight fraction tends to increase the melt viscosity of the adhesive and can make it more difficult to process. Both the $M_w$ and the $M_n$ of the poly-α-olefin polymer can be measured by gel permeation chromatography.

The substantially uncrosslinked poly-α-olefin polymer has an average inherent viscosity (IV) that is selected to be low enough to facilitate melt processing of the adhesive, thereby making the adhesive articles more easily recycled. However, the IV should not be so low that the poly-α-olefin polymer can flow or creep over time at room temperature resulting in the adhesion to painted metal surfaces (such as found on motor vehicles) being overly high or adhesive residue remaining on the painted metal surface after removing the article. Within these guidelines, the IV of the poly-α-olefin polymer should be in the range of about 1.0 to 5.0 dl/g. However, a more restricted range is desired if the poly-α-olefin polymer is to be hot melt processable. In this event, the IV should be greater than about 1.5 dl/g and less than about 3.2 dl/g for polyoctene and, for polyhexene, greater than about 1.5 dl/g and less than about 2.6 dl/g. More preferably, the IV of the poly-α-olefin polymer is about 2.1 dl/g. IV can be measured by ASTM D 2857-93, "Standard Practice for Dilute Solution Viscosity of Polymers."

The poly-α-olefin polymer is substantially uncrosslinked by which it is meant that while the poly-α-olefin polymer is preferably uncrosslinked, a small amount of crosslinking is permissible so long as the initial adhesion of the article to painted metal surfaces has not become unacceptably high and the article remains recyclable. The poly-α-olefin polymer thus has a gel content that is preferably less than 2 weight %, more preferably less than 1 weight %.

The poly-α-olefin polymer can be prepared by polymerizing α-olefin monomers in the presence of Ziegler-Natta catalysts over a wide range of temperatures (e.g. 0° to 140° C., preferably 30 to 90° C.). The polymerization can be done in bulk or in inert solvents. Suitable examples of inert solvents include aliphatic, aromatic and cycloaliphatic hydrocarbons (e.g., pentane, hexane, heptane, benzene, toluene, cyclopentane and cyclohexane). The amount of catalyst is preferably in the range of 0.1 g. to 5 g. per kg. of monomer, more preferably 0.2 g. to 3 g. per kg. of monomer, most preferably 0.5 g. to 2 g. per kg. of monomer. Ziegler-Natta catalysts are well known in the art and are disclosed, for example, in Odian, G., *Principles of Polymerization,* Ch. 8.4 (Second Edition, J. Wiley & Sons, NY, 1981) and Boor, J., *Ziegler-Natta Catalysts and Polymerizations,* Ch. 19 (Academic Press, NY, 1979). For additional discussion of olefin polymers and methods of preparation, see Kirk-Othmer, *Encyclopedia of Chemical Technology,* 3rd Edition, Vol. 16, pp. 470–484.

The pressure sensitive adhesive used in the invention also includes a cold flow restricting agent, which is a solid material that reduces the flow of the adhesive under normal use temperatures, such that the initial adhesion of the article to painted metal surfaces is not too high and such that adhesive residue does not remain on the surface after the article has been removed. Normal use temperatures may be as high as about 80° C. when the adhesive article is used to protect motor vehicles during manufacture, transport and storage. Consequently, the cold flow restricting agent preferably has a softening point of at least about 80° C. Examples of useful cold flow restricting agents include polyolefins such as polyethylene and polypropylene, copolymers of polyolefins such as ethylene-vinyl acetate, blends of polyolefins with other polymers such as a blend of polypropylene and thermoplastic elastomer, certain tackifying resins, butyl rubber, and block copolymers (which may be hydrogenated or not) such as styrene-butadiene-styrene, styrene-isoprene-styrene, and styrene-ethylene/butylene-styrene block copolymers. Polypropylene is preferred.

The cold flow restricting agent is used in an effective amount. As the amount of cold flow restricting agent increases, the initial adhesion may be too low and the adhesive may no longer demonstrate pressure sensitive properties (i.e., aggressive tackiness upon the application of only light finger pressure). As the amount of cold flow restricting agent decreases, the adhesive may be too tacky, may cold flow, or a protective article prepared from the adhesive may leave a residue around creased and bubbled areas in the protective article. Thus the cold flow restricting agent should be used in an amount sufficient to yield a pressure sensitive adhesive that does not have overly high or low adhesion to painted metal surfaces and which can be cleanly removed from the surface. Within these parameters, the cold flow restricting agent is typically used in an amount of about 5 to 30 parts by weight per 100 parts by weight of the poly-α-olefin polymer, more preferably about 15 to 20 parts by weight, and most preferably about 20 parts by weight.

The pressure sensitive adhesive can optionally contain other ingredients such as antioxidants, ultraviolet absorbers, anti-static agents, fillers, tackifying resins, colorants, dyes, pigments, and flame retardants. The optional ingredients may be present in any amount such that the performance of the adhesive articles of the invention (e.g., imprinting, adhesion, clean removal, recyclability) are not materially adversely affected.

The thickness of the adhesive layer in the articles of the invention is about 5 to 50 $\mu$m, more preferably about 5 to 25 $\mu$m, and most preferably about 5 to 18 $\mu$m for economy. When the thickness of the adhesive layer is greater than about 50 $\mu$m, the amount of cold flow increases, and the amount of residue that remains after article removal increases. When the thickness of the adhesive layer is less than about 5 $\mu$m, the adhesive may not be able to sufficiently prevent imprinting of the painted surface.

The adhesive articles of the invention include a backing. Preferably, the backings used in the adhesive articles of the invention are sufficiently conformable and non-elastic that they can easily follow the complex, multiplanar contours typically found in motor vehicles. When stretched during application to fit a particular three-dimensional geometry, the articles should retain the three-dimensional shape that has been imparted to them. The backings should be flexible and have a tear strength that permits the adhesive articles to bend around sharp corners and edges typically found in motor vehicles without breaking or tearing. The adhesive articles should be capable of being removed from the motor vehicle without tearing into several pieces. Such properties are enhanced by employing backings that have good tear strength in the machine direction and, preferably, good tear strength in both the machine and the cross directions. Backings useful in the invention should also have a tensile strength of about 3,000 to 6,000 psi and a 1% secant modulus of about 55,000 to 75,000 psi.

Suitable materials for the backing include impact modified polypropylene such as polypropylene modified with ethylene-propylene (E-P) rubber and polypropylene modified with thermoplastic elastomer (e.g. styrene-butadiene-styrene block copolymer). Examples of commercially available impact modified polypropylene include E-P rubber modified polypropylene from Shell Polypropylene Company, Houston, Tex., Himont Company, Houston, Tex., Exxon Chemical Company, Houston, Tex., and Dow Chemical Company, Midland, Mich.

The backing may contain additional ingredients (such as those described above for the pressure sensitive adhesive) to add stiffness, to impart weatherability or the ability to reflect heat, and the like. The backing may be oriented, for example uniaxially oriented or biaxially oriented by tubular expansion. Orientation in the machine direction up to 1.2× can improve the impact resistance of the adhesive articles of the invention. If orientation exceeds 1.2×, the tear strength of the adhesive articles may decrease. The thickness of the backing can vary with the intended end use for the article. For example, if the article is used as an anti-mutilation tape (e.g., to provide protection from light scratches), the thickness of the backing is preferably about 75 to 150 $\mu$m. If the article is used to provide protection on horizontal surfaces (e.g., protection from fluids, grime, and light gravel chips), the thickness of the backing is preferably about 35 to 65 $\mu$m.

The adhesive articles of the invention can be provided with additional layers. For example, the adhesive articles may include a layer of printing on the backing, which is especially useful when the adhesive article is used as a label or to provide advertising. The adhesive article may include a release layer such as a low adhesion backsize on the backing to facilitate providing the adhesive article in roll form (such as a tape roll) for easy storage and dispensing. For economy, the thickness of the low adhesion backsize may be about 2.5 $\mu$m or less. The adhesive articles may include a release liner (i.e., a substrate coated with a release agent such as silicone-coated paper) to provide the ability to die cut the adhesive articles into specific shapes such as for protecting around door handles.

The adhesive articles of the invention can be prepared by a variety of techniques. For example, the adhesive can be extruded onto a preformed backing or the extruded adhesive and the preformed backing can be nipped together. In the case of heat sensitive backings, the backing should be offset slightly from the extruder to permit the extruded adhesive to cool before contacting the backing. Alternatively, the adhesive articles can be prepared by laminating a preformed film of the pressure sensitive adhesive to a preformed backing using heat and pressure as needed to ensure a good bond between the adhesive and the backing. Still another useful manufacturing technique involves coating the pressure sensitive adhesive out of water or an organic solvent onto a preformed backing and then evaporating the water or solvent by drying in air or in a low temperature oven. Alternatively, the pressure sensitive adhesive can be coated out of water or an organic solvent onto a release liner, dried and laminated to a preformed backing. However, the most preferred approach is coextrusion of the different layers of the adhesive article such as coextruding the pressure sensitive adhesive, the backing and a low adhesion backsize through either a feedblock die or a multimanifold die. Combinations of these different manufacturing techniques may also be used such as coextruding the backing and the low adhesion backsize and then laminating or solvent coating the pressure sensitive adhesive.

Quite advantageously, the adhesive articles of the invention display a variety of properties that make them especially useful as protective adhesive covers, such as for protecting a painted motor vehicle from damage during manufacture, transport and storage. The adhesive articles of the invention do not imprint painted metal surfaces such as the finish of a painted motor vehicle. The adhesive articles are useful with a variety of different paints frequently used to finish motor vehicles such as polyurethanes, melamine-acrylics, and acid-catalyzed epoxies. Furthermore, the protective adhesive articles of the invention display good initial adhesion to painted metal surfaces so that the protective articles will not come loose during use. Yet, the protective adhesive articles can be easily and cleanly removed from the same surface without tearing into pieces and without leaving an adhesive residue on the surface. Once removed, the protective adhesive articles of the invention can be recycled, by which it is meant that they can be subsequently melt processed (e.g., ground up and extruded through a film forming die such as that described in conjunction with example 6 below for recycling). The resulting melt or extrudate is sufficiently free from gels (typically less than 15% gel content, whether from the adhesive or the backing) to permit the melt or extrudate to be reused, for example in the manufacture of new protective adhesive articles as well as in the manufacture of plastic bags and other items that employ non-virgin starting materials.

In use, the protective adhesive articles of the invention are often provided in the form of jumbo rolls, with a release liner to protect the pressure sensitive adhesive or with a low adhesion backsize on the backing. The protective adhesive article is unrolled and, for example, is stretched firmly over those portions of the motor vehicle that are to be protected from damage. The pressure sensitive adhesive provides good adhesion to the painted metal surface of the motor vehicle and without imprinting it. The conformability and non-elasticity of the backing enables the protective adhesive article to closely follow the complex, multiplanar contours of the motor vehicle and to retain the three-dimensional shape that it assumes upon application. When the protection afforded by the adhesive article is no longer needed or desired, it may be cleanly and easily removed without tearing into pieces and without leaving an adhesive residue on the motor vehicle.

The many advantages of the adhesive articles of the invention are further illustrated by the following non-limiting examples in which all parts are given as parts by weight unless otherwise stated. Various abbreviations are used in the examples. The abbreviations are defined according to the following schedule.

| Abbreviation | Description |
| --- | --- |
| SRD7-462 | Polypropylene with 30% ethylene-propylene rubber phase and having a melt flow index of 7.0, manufactured by Shell Polypropylene Company |
| SRD7-C55H | Polypropylene with 29% ethylene-propylene rubber phase and having a melt flow index of 1.0, manufactured by Shell Polypropylene Company |
| Exxon 403 | White pigmented, ultraviolet resistant polypropylene film, nominal thickness = 45 $\mu$m by basis weight |
| Eastoflex D-127S | 60% hexene/40% propylene copolymer, approximate IV = 0.6–0.8, commercially available from Texas Eastman |
| Ampacet LR85637 | Precompounded pellet of 50% polypropylene and 50% DuPont R-960 TiO$_2$ pigment, manufactured by Ampacet Corporation |
| Ampacet 40857 | Precompounded pellet of polyethylene and 10% Tinuvin 622, manufactured by Ampacet Corporation |
| Ampacet 10478 | Precompounded pellet of 60% low density polyethylene, 27.5% linear low density polyethylene, 10% Tinuvin 622, and 2.5% Irganox 1010, manufactured by Ampacet Corporation |
| Tinuvin 622 | Hindered amine stabilizer from Ciba-Giegy Corporation |
| Irganox 1010 | Phenolic antioxidant from Ciba-Giegy Corporation |
| Escorene PP-3505G | Polypropylene resin, nominal melt flow rate = 400, commercially available from Exxon Chemical Company |

-continued

| Abbreviation | Description |
| --- | --- |
| Aspun PE6806 | Linear low density polyethylene resin, melt index = 105, commercially available from Dow Chemical Company |
| Lupersol 101 | 2,5-dimethyl-2,5-di(t-butylperoxy)hexane, commercially available from Elf Atochem North America, Inc., Philadelphia, PA |
| Lupersol 130 | 2,5-dimethyl-2,5-di(t-butylperoxy)hex-3-yne, commercially available from Elf Atochem North America, Inc. |

EXAMPLE 1

A protective article according to the invention was prepared by extruding precompounded pressure sensitive adhesive onto a preformed white pigmented polypropylene backing (Exxon 403). The pressure sensitive adhesive was prepared by blending 200 parts of a 2.1 IV polyhexene polymer having a solids content greater than 99%, and 0.25% Irganox 1010 (based on the amount of polyhexene solids) in a PL 2000 Plasticorder mixer (manufactured by C. W. Brabender Company) maintained at 190° C. 35.3 parts Escorene PP-3505G were added to the molten polyhexene. The blend was mixed for 20 minutes at 190° C., then cooled to below 100° C., and removed from the mixer.

The precompounded adhesive was extruded to a thickness of 17.5 $\mu$m ±3 $\mu$m onto the preformed Exxon 403 backing using a 1.9 cm Haake extruder that was held approximately 2.0 cm away from the backing. The die width was 12.7 cm and the extruder zone temperatures were maintained as follows: Zone 1=unheated (but registered 38° C. due to heat transfer), Zone 2=190° C., Zone 3=190° C., die=190° C. A release liner (40 lb. unbleached calendered paper coated with a silicone release agent on one surface) was laminated to the backing at the time of extrusion to facilitate provision of the protective article in roll form.

EXAMPLE 2

Example 2 was prepared in accordance with the procedure described in example 1 except that the polyhexene had an IV of about 2.4 to 2.6 dl/g.

EXAMPLE 3

Example 3 was prepared in accordance with the procedure described in example 1 except that the polyhexene had an IV of 1.7 dl/g.

EXAMPLE 4

Example 4 was prepared in accordance with the procedure described in example 1 except that the adhesive included 22.2 parts Escorene PP-3505G.

EXAMPLE 5

Example 5 was prepared in accordance with the procedure described in example 1 except that the adhesive included 50 parts Escorene PP-3505G.

EXAMPLE 6

Example 6 was prepared by coextruding a low adhesion backsize, a backing, and a pressure sensitive adhesive using a multimanifold die that spread each of the streams in an independent manifold across the entire width of the die. In the final 4 cm of the die, the streams came together and the flow of each stream was stable. The temperature and flow rates were adjusted such that the thickness of each layer across the width of the die was uniform.

More specifically, the polyhexene of example 1 was precompounded with Escorene PP-3505G polypropylene in a continuous process using a 3 cm twin screw, three zone extruder where the temperature was maintained at 190° C. throughout. The weight ratio of polyhexene to polypropylene was 85%/15%. The precompounded adhesive was fed into the multimanifold die with a 5 cm orifice Bonnot feed system. The hose from the Bonnot feed system to the multimanifold die was heated to 180° C.

The formulation of the backing was 75 parts SRD7-462, 25 parts Ampacet LR85637 and 5 parts Ampacet 10478. Pellets of these materials were mixed together and fed through a 4.4 cm Prodex extruder with a polypropylene screw. The temperatures in the extruder were Zone 1=180° C., Zone 2= 190° C., Zone 3=203° C., and Zone 4=221° C. The hot extrudate fed into the multimanifold die.

The low adhesion backsize comprised Aspun PE6806 with n-methyl perfluorooctanesulfoamido ethyl acrylate in the presence of a 50/50 weight % homogeneous blend of Lupersol 101 and Lupersol 130. All three reactants were added to the first zone of a Berstorff 40 mm diameter, 1600 mm length co-rotating twin screw extruder (Berstorff Corp., Charlotte, N.C.) outfitted with partially intermeshing forwarding screws rotating at 150 revolutions per minute. Fully intermeshing kneading blocks were located in zones four, six, seven and nine. The overall flowrate of the reactants was 605 g/min, with the Aspun PE6806 constituting 99%, the n-methyl perfluorooctanesulfonamido ethyl acrylate 1%, and the Lupersol 101/Lupersol 130 blend 0.02% of the flowrate. The extruder temperature profile for each of the ten 160 mm length zones was: Zone 1=25° C., Zone 2=77° C., Zone 3=184° C., Zone 4=180° C., Zone 5 =190° C., Zone 6=205° C., Zone 7=203° C., Zone 8=200° C., Zones 9 and 10=201° C., endcap=199° C., and melt pump=200° C. Zone 8 was vacuum vented.

The grafted Aspun PE6806 was extruded out of a stranding die into a water cooling bath and the material was then pelletized into generally cylindrical pellets of about 3 mm in length and 1.5 mm in diameter. The pellets were then dried in an oven for 4 hours at 66° C. to remove residual moisture. The grafted Aspun PE6806 pellets were fed into the multimanifold die by a 3.1 cm Killion single screw extruder having Zone 1=180° C., Zone 2=188° C., Zone 3=190° C., and Zone 4=206° C. The multimanifold die temperature was 190° C. and the extrudate was drawn to a vertical nip where the release coating was against a smooth silicone roll and the adhesive was against a chrome roll at 19° C. which was wrapped with a silicone coated film. The line was run at 10 meters per minute and the extruder flow rates were balanced to give a protective article having a total thickness of 75 µm. The low adhesion backsize was 18 µm, the backing was 42 µm, and the pressure sensitive adhesive was 15 µm thick.

The recyclability of the protective articles of the invention was demonstrated by feeding the protective article of this example into a 1.9 cm Haake extruder having a 12.7 cm wide die, a 125 µm die orifice, and the following temperature profile in the different zones: Zone 1=180° C., Zone 2=202° C., Zone 3=210° C., die=210° C. No gels were found upon visual examination of the extruded sheet. The sheet was considered to be useful as a material that could be recycled into various products.

COMPARATIVE EXAMPLE 1

Comparative example 1 was prepared as described in conjunction with example 1 except that the adhesive did not include Escorene PP-3505G.

COMPARATIVE EXAMPLE 2

Comparative example 2 was prepared as described in conjunction with example 1 except that the adhesive did not include Escorene PP-3505G and Eastoflex D-127S was used in place of the polyhexene.

COMPARATIVE EXAMPLE 3

Comparative example 3 was Polymask 2476, an adhesive coated article commercially available from The Polymask Corporation, Conover, N.C. for protecting motor vehicles during manufacture, transport and storage.

EXAMPLES 7 to 12

Examples 7 to 12 were prepared by coextruding a pressure sensitive adhesive, a backing, and a low adhesion backsize. In each example the pressure sensitive adhesive was a blend of polyhexene and Escorene PP-3505G polypropylene. The IV of the polyhexene and the relative weight percents (wt. %) of the polyhexene and the polypropylene are shown below in Table 1. The backing in each example was the same and comprised 80 parts SRD7-C55H, 20 parts Ampacet LR85637, and 5 parts Ampacet 40857. (In examples 7 to 12 "parts" does not refer to "parts by weight.") The low adhesion backsize in each example was the same as used in example 6.

More specifically, the pressure sensitive adhesive was prepared by compounding the polyhexene and the polypropylene in a continuous process by feeding molten polyhexene and granular polypropylene to a 34 mm counter-rotating Leistritz twin screw extruder (Leistritz LSM 30.34 GC, Nurenberg, Germany; length to diameter ratio=35) at a feed rate such that it provided the desired polyhexene to propylene weight ratio. For examples 7 to 9, the 18 temperature zones of the extruder were all set at 177° C. For examples 10 to 12, the 18 temperature zones of the extruder were all set at 193° C. The compounded adhesive was then fed into a Cloeren 3 layer feedblock.

The ingredients for the backing were fed to the Cloeren feedblock through a 31.75 mm Killion extruder having temperature zones of Zone 1=163° C., Zone 2=202° C., and Zones 3 & 4=232° C.

The ingredients for the low adhesion backsize were fed to the Cloeren feedblock through a 19.05 mm Killion extruder having temperature zones of Zone 1=132° C., Zone 2=166° C., and Zones 3 & 4=177° C.

The pressure sensitive adhesive, the backing, and the low adhesion backsize were brought together just as they entered the feedblock and were coextruded onto a chrome casting roll with the backing next to the chrome roll. The resulting protective adhesive article was wound around a takeup roll. The thickness of the low adhesion backsize was about 2.5 µm, the thickness of the backing was about 53 µm, and the thickness of the pressure sensitive adhesive was about 20 µm.

TABLE 1

| Example | Polyhexene IV (dl/g) | Polyhexene (wt. %) | Polypropylene (wt. %) |
|---|---|---|---|
| 7 | 1.6 | 80.0 | 20.0 |
| 8 | 1.6 | 82.5 | 17.5 |
| 9 | 1.6 | 85.0 | 15.0 |
| 10 | 2.1 | 80.0 | 20.0 |

TABLE 1-continued

| Example | Polyhexene IV (dl/g) | Polyhexene (wt. %) | Polypropylene (wt. %) |
|---|---|---|---|
| 11 | 2.1 | 82.5 | 17.5 |
| 12 | 2.1 | 85.0 | 15.0 |

EXAMPLES 13 to 16

Examples 13 to 16 were prepared by coextruding a pressure sensitive adhesive, a backing, and a low adhesion backsize as described in conjunction with examples 7 to 12 except that the polyhexene was replaced with a 2.8 IV polyoctene and the 18 temperature zones of the Leistritz extruder were all set at 193° C. The relative weight percents of the polyoctene and the polypropylene are shown below in Table 2.

TABLE 2

| Example | Polyoctene (wt. %) | Polypropylene (wt. %) |
|---|---|---|
| 13 | 77.0 | 23.0 |
| 14 | 80.0 | 20.0 |
| 15 | 82.5 | 17.5 |
| 16 | 85.0 | 15.0 |

Test Procedures

Examples 1 to 16 and comparative examples (C.E.) 1 to 3 were tested to evaluate their utility in protecting motor vehicles from damage that could occur during manufacture, transport and storage. More specifically, these examples were evaluated for paint imprinting (i.e., the tendency of the article to leave an imprinted pattern on a surface of a painted motor vehicle), adhesive transfer to the surface of a painted motor vehicle, and peel adhesion to the surface of a painted motor vehicle under different conditions. The test procedures are described more fully below and the results of these tests are shown in Table 3 which follows.

General Preparation of Painted Test Panels

Panels were prepared to simulate the surface of a painted motor vehicle. More specifically, premade 4 inch (10 cm)×12 inch (30 cm) cold rolled steel panels bearing a corrosion inhibiting coating (ED-5000, available from PPG Industries, Cleveland, Ohio), covered with a black paint base coat (872AB921 Black, available from E. I. duPont de Nemours Company, Inc.), and overcoated with a protective clearcoat (RK 7103, available from E. I. duPont de Nemours Company, Inc.) were obtained from Advanced Coating Technologies, Inc., Hillsdale, Mich. A 2 inch (5 cm)×12 inch (30 cm) section of the panel was masked off and the remaining area of the panel was sprayed with a highly catalyzed repair paint (RK 7103 Low Bake Version, available from E. I. duPont de Nemours Company, Inc.). The painted panel was cured at about 180–200° F. for about 30 minutes. The crosslink density of repair paint is typically much less than in those paints used and cured during the manufacture of the original equipment (which was simulated by the masked portion of the painted panel). Due to the lower crosslink density, repair paints are more likely to exhibit viscoelastic flow and are, therefore, more susceptible to surface impressions that could be caused by a protective article that covers it.

Paint Imprinting Test

A 25 mm×120 mm sample of the protective article was adhesively applied with thumb pressure to the painted test panel across both the repair paint and the original equipment paint surfaces. A corner of the protective article on the repair paint was lifted, placed 15 mm from the remaining corner on the repair paint, and pressed again with thumb pressure to form a fold or crease in the article. The process was repeated for the original equipment painted surface of the panel. Comparative example 3 was similarly applied. The taped panel was then placed in an oven at 80° C. for 24 hours, removed from the oven, and allowed to cool at room temperature for 2 hours. The tapes were removed by hand and the depth and sharpness of the paint imprinting in the creased areas of the test panel were visually examined and graded. The protective articles of the invention were considered to have passed this test if the creased areas showed less swelling or topological surface change than the commercially available material of comparative example 3.

Adhesive Transfer

Adhesive transfer refers to adhesive residue that remains on the painted surface after removal of the protective article and may result from an adhesive having low cohesive strength, overly high adhesion, too much viscoelastic flow, or combinations of these. The protective article to be tested was applied to a panel prepared according to the "General Preparation of a Painted Test Panel" procedure and the "Paint Imprinting Test." The protective article was removed from the panel and examined for visible adhesive residue. A panel was considered to have passed if there was no visible evidence of adhesive residue on both the original equipment paint and repair paint surfaces.

180° Peel Adhesion

A 25 mm×150 mm sample of the protective article to be tested was adhesively applied using thumb pressure to a test panel that had been prepared according to the "General Preparation of a Painted Test Panel" procedure and then wiped with isopropanol using a clean, lint free cloth. Once applied, the protective article was free of bubbles and the adhesive was in intimate contact with the panel. After a dwell time of 24 hours at room temperature, the peel adhesion to the original equipment paint surface was determined by clamping the panel in the jaws of an Instron tensile tester and peeling the tape away from the panel at a 180° angle and at a crosshead speed of 300 mm/minute. The peel adhesion value was recorded in grams/25 mm. Preferably, the peel adhesion is less than 1000 grams/25 mm.

Aged 180° Peel Adhesion

The sample was prepared and tested as described in the "180° Peel Adhesion" test. Before measuring the peel adhesion to the original equipment paint surface, the sample was aged at 80° C. for 24 hours in an air circulating oven, removed from the oven, and allowed to cool at room temperature for 1 hour. Preferably, the aged adhesion is less than 1000 grams/25 mm.

TABLE 3

| Example | Paint Imprint Test | Adhesive Transfer Test | 180° Peel Adhesion (g/25 mm) | Aged 180° Peel Adhesion (g/25 mm) |
|---|---|---|---|---|
| 1 | Pass | Pass | 277 | 515 |
| 2 | Pass | Pass | 764 | 880 |
| 3 | Pass | Pass | 354 | 835 |
| 4 | Pass | Pass | 365 | 928 |

TABLE 3-continued

| Example | Paint Imprint Test | Adhesive Transfer Test | 180° Peel Adhesion (g/25 mm) | Aged 180° Peel Adhesion (g/25 mm) |
|---|---|---|---|---|
| 5 | Pass | Pass | 747 | 838 |
| 6 | Pass | Pass | 190 | 790 |
| 7 | Pass | Pass | 165 | 950 |
| 8 | Pass | Pass | 498 | 783 |
| 9 | Pass | Pass | 744 | 812 |
| 10 | Pass | Pass | 75 | 130 |
| 11 | Pass | Pass | 152 | 234 |
| 12 | Pass | Pass | 322 | 458 |
| 13 | Pass | Pass | 68 | 212 |
| 14 | Pass | Pass | 291 | 404 |
| 15 | Pass | Pass | 546 | 603 |
| 16 | Pass | Pass | 639 | 767 |
| C.E. 1 | Pass | Fail | 889 | 863 |
| C.E. 2 | Pass | Fail | 597 | 354 |
| C.E. 3 | Fail | Pass | 348 | 696 |

These data show that protective adhesive articles according to the invention have good initial adhesion to painted metal surfaces but can also be easily removed without leaving adhesive residue and without imprinting the painted surface.

Various modifications and alterations of this invention will become apparent to those skilled in the art without departing from the scope and spirit of the invention. It should be understood that this invention is not limited to the illustrative embodiments set forth herein.

The embodiments for which an exclusive property or privilege is claimed are defined as follows:

1. An adhesive article comprising:
   (a) a backing having opposed top and bottom surfaces; and
   (b) a pressure sensitive adhesive on the bottom surface of the backing, the pressure sensitive adhesive comprising:
      (1) a substantially uncrosslinked poly-α-olefin polymer having an inherent viscosity of about 1.0 to 5.0 dl/g and selected from the group consisting of polyhexene, polyoctene, and mixtures thereof; and
      (2) an effective amount of a cold flow restricting agent.

2. An adhesive article according to claim 1 wherein the substantially uncrosslinked poly-α-olefin polymer has a polydispersity index less than or equal to about 10.

3. An adhesive article according to claim 1 wherein the cold flow restricting agent has a softening point of at least about 80° C.

4. An adhesive article according to claim 1 wherein the cold flow restricting agent is selected from the group consisting of polyethylene, polypropylene, ethylene-vinyl acetate, blends of a polyolefin and a thermoplastic elastomer, styrene-butadiene-styrene block copolymer, styrene-isoprene-styrene block copolymer and styrene-ethylene/butylene-styrene block copolymer.

5. An adhesive article according to claim 1 wherein the cold flow restricting agent comprises about 5 to 30 parts by weight per 100 parts by weight of the poly-α-olefin polymer.

6. An adhesive article according to claim 1 wherein the backing has a tensile strength of about 3,000 to 6,000 psi.

7. An adhesive article according to claim 1 wherein the backing is a material selected from the group consisting of impact modified polypropylene, polypropylene homopolymer blended with low density polyethylene, and, copolymer of polyethylene and polyoctene blended with low density polyethylene.

8. An adhesive article according to claim 1 wherein the adhesive article further includes a layer of printing on the backing.

9. An adhesive article according to claim 1 wherein the adhesive article further includes a release layer on the top surface of the backing.

10. A recyclable, protective adhesive article for protecting a motor vehicle from damage during manufacture, transport or storage thereof, the adhesive article comprising:
    (a) a backing having opposed top and bottom surfaces; and
    (b) a pressure sensitive adhesive on the bottom surface of the backing, the pressure sensitive adhesive comprising:
       (1) a substantially uncrosslinked poly-α-olefin polymer having an inherent viscosity of about 1.0 to 5.0 dl/g and selected from the group consisting of polyhexene, polyoctene, and mixtures thereof; and
       (2) an effective amount of a cold flow restricting agent.

11. A recyclable, protective adhesive article according to claim 10 wherein the poly-α-olefin polymer is polyhexene with an inherent viscosity of about 1.5 to 2.6 dl/g.

12. A recyclable, protective adhesive article according to claim 10 wherein the poly-α-olefin polymer is polyoctene with an inherent viscosity of about 1.5 to 3.2 dl/g.

13. A recyclable, protective adhesive article according to claim 10 wherein the cold flow restricting agent has a softening point of at least about 80° C.

14. A recyclable, protective adhesive article according to claim 13 wherein the cold flow restricting agent comprises about 15 to 20 parts by weight per 100 parts by weight of the poly-α-olefin polymer.

15. A recyclable, protective adhesive article according to claim 14 wherein the cold flow restricting agent is polypropylene.

16. A recyclable, protective adhesive article according to claim 10 that is adhesively bonded to a painted metal surface.

17. A recyclable, protective adhesive article according to claim 10 that is adhesively bonded to a painted surface of a motor vehicle.

18. A recyclable, protective adhesive article according to claim 17 that can be removed from the painted surface of the motor vehicle without leaving visible traces of the pressure sensitive adhesive on the painted surface and without imprinting the painted surface.

19. A roll of a recyclable, protective adhesive article for protecting a motor vehicle from damage during manufacture, transport or storage thereof, the adhesive article comprising:
    (a) a conformable, non-elastic backing having opposed top and bottom surfaces;
    (b) a pressure sensitive adhesive on the bottom surface of the backing, the pressure sensitive adhesive comprising:
       (1) 100 parts by weight of a substantially uncrosslinked poly-α-olefin polymer having an inherent viscosity of about 1.0 to 5.0 dl/g and selected from the group consisting of polyhexene, polyoctene, and mixtures thereof; and
       (2) about 15 to 20 parts by weight, per 100 parts by weight of the poly-α-olefin polymer, of a material selected from the group consisting of polyethylene, polypropylene, ethylene-vinyl acetate, blends of a polyolefin and a thermoplastic elastomer, hydrogenated styrene-isoprene-styrene block copolymer, and hydrogenated styrene-ethylene/butylene-styrene block copolymer; and
(c) a low adhesion backsize on the top surface of the backing.

20. A recyclable, protective adhesive article according to claim 19 wherein the backing, the pressure sensitive adhesive, and the low adhesion backsize are coextruded.

21. An adhesive article comprising:
(a) a backing having opposed top and bottom surfaces; and
(b) a pressure sensitive adhesive on the bottom surface of the backing, the pressure sensitive adhesive comprising:
(1) a substantially uncrosslinked poly-α-olefin polymer selected from the group consisting of polyhexene, polyoctene, and mixtures thereof; and
(2) an effective amount of a cold flow restricting agent;
wherein the adhesive article has a 180° peel adhesion of less than 1000 grams/25 mm with respect to the painted surface of a motor vehicle.

22. A recyclable, protective adhesive article for protecting a motor vehicle from damage during manufacture, transport or storage thereof, the adhesive article comprising:
(a) a backing having opposed top and bottom surfaces; and
(b) a pressure sensitive adhesive on the bottom surface of the backing, the pressure sensitive adhesive comprising:
(1) a substantially uncrosslinked poly-α-olefin polymer selected from the group consisting of polyhexene, polyoctene, and mixtures thereof; and
(2) an effective amount of a cold flow restricting agent;
wherein the adhesive article has a 180° peel adhesion of less than 1000 grams/25 mm with respect to the painted surface of a motor vehicle.

23. An adhesive article comprising:
(a) a backing having opposed top and bottom surfaces; and
(b) a pressure sensitive adhesive on the bottom surface of the backing, the pressure sensitive adhesive comprising:
(1) a substantially uncrosslinked poly-α-olefin polymer having an inherent viscosity of about 1.0 to 5.0 dl/g and selected from the group consisting of a copolymer of hexene and octene, a copolymer of hexene and propylene, a copolymer of octene and propylene, and mixtures thereof; and
(2) an effective amount of a cold flow restricting agent.

24. An adhesive article according to claim 23 wherein the substantially uncrosslinked poly-α-olefin polymer has a polydispersity index less than or equal to about 10.

25. An adhesive article according to claim 23 wherein the cold flow restricting agent has a softening point of at least about 80C.

26. An adhesive article according to claim 23 wherein the cold flow restricting agent is selected from the group consisting of polyethylene, polypropylene, ethylene-vinyl acetate, blends of a polyolefin and a thermoplastic elastomer, styrene-butadiene-styrene block copolymer, styrene-isoprene-styrene block copolymer and styrene-ethylene/butylene-styrene block copolymer.

27. An adhesive article according to claim 23 wherein the cold flow restricting agent comprises about 5 to 30 parts by weight per 100 parts by weight of the poly--olefin polymer.

28. An adhesive article according to claim 23 wherein the backing has a tensile strength of about 3,000 to 6,000 psi.

29. An adhesive article according to claim 23 wherein the backing is a material selected from the group consisting of impact modified polypropylene, polypropylene homopolymer blended with low density polyethylene, and, copolymer of polyethylene and polyoctene blended with low density polyethylene.

30. An adhesive article according to claim 23 wherein the adhesive article farther includes a layer of printing on the backing.

31. An adhesive article according to claim 23 wherein the adhesive article further includes a release layer on the top surface of the backing.

32. A recyclable, protective adhesive article for protecting a motor vehicle from damage during manufacture, transport or storage thereof, the adhesive article comprising:
(a) a backing having opposed top and bottom surfaces; and
(b) a pressure sensitive adhesive on the bottom surface of the backing, the pressure sensitive adhesive comprising:
(1) a substantially uncrosslinked poly-α-olefin polymer having an inherent viscosity of about 1.0 to 5.0 dl/g and selected from the group consisting of a copolymer of hexene and octene, a copolymer of hexene and propylene, a copolymer of octene and propylene, and mixtures thereof; and
(2) an effective amount of a cold flow restricting agent.

33. A recyclable, protective adhesive article according to claim 32 wherein the cold flow restricting agent has a softening point of at least about 80C.

34. A recyclable, protective adhesive article according to claim 33 wherein the cold flow restricting agent comprises about 15 to 20 parts by weight per 100 parts by weight of the poly--olefin polymer.

35. A recyclable, protective adhesive article according to claim 34 wherein the cold flow restricting agent is polypropylene.

36. A recyclable, protective adhesive article according to claim 32 that is adhesively bonded to a painted metal surface.

37. A recyclable, protective adhesive article according to claim 32 that is adhesively bonded to a painted surface of a motor vehicle.

38. A recyclable, protective adhesive article according to claim 37 that can be removed from the painted surface of the motor vehicle without leaving visible traces of the pressure sensitive adhesive on the painted surface and without imprinting the painted surface.

39. A roll of a recyclable, protective adhesive article for protecting a motor vehicle from damage during manufacture, transport or storage thereof, the adhesive article comprising:
(a) a conformable, non-elastic backing having opposed top and bottom surfaces;
(b) a pressure sensitive adhesive on the bottom surface of the backing, the pressure sensitive adhesive comprising:
(1) 100 parts by weight of a substantially uncrosslinked poly-α-olefin polymer having an inherent viscosity of about 1.0 to 5.0 dl/g and selected from the group consisting of a copolymer of hexene and octene, a copolymer of hexene and propylene, a copolymer of octene and propylene, and mixtures thereof; and
(2) about 15 to 20 parts by weight, per 100 parts by weight of the poly--olefin polymer, of a material selected from the group consisting of polyethylene, polypropylene, ethylene-vinyl acetate, blends of a polyolefin and a thermoplastic elastomer, hydrogenated styrene-isoprene-styrene block copolymer, and hydrogenated styrene-ethylene/butylene-styrene block copolymer; and (c) a low adhesion backsize on the top surface of the backing.

40. A recyclable, protective adhesive article according to claim 39 wherein the backing, the pressure sensitive adhesive, and the low adhesion backsize are coextruded.

41. An adhesive article comprising:

(a) a backing having opposed top and bottom surfaces; and (b) a pressure sensitive adhesive on the bottom surface of the backing, the pressure sensitive adhesive comprising:

(1) a substantially uncrosslinked poly-α-olefin polymer selected from the group consisting of a copolymer of hexene and octene, a copolymer of hexene and propylene, a copolymer of octene and propylene, and mixtures thereof; and (2) an effective amount of a cold flow restricting agent; wherein the adhesive article has a 180° peel adhesion of less than 1000 grams/25 mm with respect to the painted surface of a motor vehicle.

42. A recyclable, protective adhesive article for protecting a motor vehicle from damage during manufacture, transport or storage thereof, the adhesive article comprising:

(a) a backing having opposed top and bottom surfaces; and (b) a pressure sensitive adhesive on the bottom surface of the backing, the pressure sensitive adhesive comprising:

(1) a substantially uncrosslinked poly-α-olefin polymer selected from the group consisting of a copolymer of hexene and octene, a copolymer of hexene and propylene, a copolymer of octene and propylene, and mixtures thereof, and (2) an effective amount of a cold flow restricting agent; wherein the adhesive article has a 180° peel adhesion of less than 1000 grams/25 mm with respect to the painted surface of a motor vehicle.

43. An adhesive article of claim 1 wherein the pressure sensitive adhesive further comprises a poly-α-olefin selected from the group consisting of a copolymer of hexene and octene, a copolymer of hexene and propylene, a copolymer of octene and propylene, and mixtures thereof.

44. A recyclable, protective article of claim 10 wherein the pressure sensitive adhesive further comprises a poly-α-olefin selected from the group consisting of a copolymer of hexene and octene, a copolymer of hexene and propylene, a copolymer of octene and propylene, and mixtures thereof.

45. A roll of a recyclable, protective article of claim 19 wherein the pressure sensitive adhesive further comprises a poly-α-olefin selected from the group consisting of a copolymer of hexene and octene, a copolymer of hexene and propylene, a copolymer of octene and propylene, and mixtures thereof.

46. An adhesive article of claim 21 wherein the pressure sensitive adhesive further comprises a poly-α-olefin selected from the group consisting of a copolymer of hexene and octene, a copolymer of hexene and propylene, a copolymer of octene and propylene, and mixtures thereof.

47. A recyclable, protective article of claim 22 wherein the pressure sensitive adhesive further comprises a poly-α-olefin selected from the group consisting of a copolymer of hexene and octene, a copolymer of hexene and propylene, a copolymer of octene and propylene, and mixtures thereof.

* * * * *

UNITED STATES PATENT AND TRADEMARK OFFICE
CERTIFICATE OF CORRECTION

PATENT NO. : 6,045,922

DATED : April 4, 2000

INVENTOR(S) : Jeffrey R. Janssen, et al.

It is certified that error appears in the above-identified patent and that said Letters Patent is hereby corrected as shown below:

Title Page, under "U.S. PATENT DOCUMENTS", the following two references should be added:
-- 5,262,216  11/1993  Popat et al.  428/42 --
-- 5,274,037  12/1993  Miller  525/98 --;

Column 15, line 65, "poly--olefin" should read -- poly-α-olefin --;

Column 16, line 8, "farther" should read -- further --;

Column 16, line 34, "poly--olefin" should read -- poly-α-olefin --; and

Column 16, line 65, "poly--olefin" should read -- poly-α-olefin --.

Signed and Sealed this

Eighth Day of May, 2001

Attest:

NICHOLAS P. GODICI

*Attesting Officer*     Acting Director of the United States Patent and Trademark Office